United States Patent
Wu et al.

(10) Patent No.: US 9,947,077 B2
(45) Date of Patent: Apr. 17, 2018

(54) VIDEO OBJECT TRACKING IN TRAFFIC MONITORING

(71) Applicant: THOMSON LICENSING, Issy de Moulineaux (FR)

(72) Inventors: Liting Wu, Beijing (CN); Zhenglong Li, Beijing (CN); Xiaojun Ma, Beijing (CN)

(73) Assignee: THOMSON LICENSING, Issy-les-Moulineaux (FR)

( * ) Notice: Subject to any disclaimer, the term of this patent is extended or adjusted under 35 U.S.C. 154(b) by 0 days.

(21) Appl. No.: 14/562,069

(22) Filed: Dec. 5, 2014

(65) Prior Publication Data

US 2015/0279021 A1    Oct. 1, 2015

(51) Int. Cl.
G06T 7/00    (2017.01)
G06T 3/40    (2006.01)
G06T 7/277    (2017.01)

(52) U.S. Cl.
CPC ............. *G06T 3/40* (2013.01); *G06T 7/277* (2017.01); *G06T 2207/10016* (2013.01); *G06T 2207/30232* (2013.01); *G06T 2207/30236* (2013.01); *G06T 2207/30241* (2013.01)

(58) Field of Classification Search
None
See application file for complete search history.

(56) References Cited

U.S. PATENT DOCUMENTS

2012/0314907 A1* 12/2012 Casamona ................ G06T 7/20
382/103
2015/0178568 A1* 6/2015 Shellshear ........... G06K 9/4647
382/103

FOREIGN PATENT DOCUMENTS

AU    2013273831 A1 *  7/2015  ......... G06K 9/00711

OTHER PUBLICATIONS

Babenko, Boris, Ming-Hsuan Yang, and Serge Belongie. "Robust object tracking with online multiple instance learning." Pattern Analysis and Machine Intelligence, IEEE Transactions on 33.8 (2011): 1619-1632.*

(Continued)

*Primary Examiner* — Vu Le
*Assistant Examiner* — Tracy Mangialaschi
(74) *Attorney, Agent, or Firm* — Brian J. Dorini; Lily Neff (57) ABSTRACT

A method and system are provided for tracking an object in a video sequence. The method includes selecting a tracking window in a current video frame, the tracking window including at least a location and a size associated with an object to be tracked, and adjusting the size of the tracking window based on an estimated change in a scale of the object, and using the adjusted tracking window for tracking the object in a subsequent video frame.

12 Claims, 8 Drawing Sheets

(56) References Cited

OTHER PUBLICATIONS

Rad, Roya, and Mansour Jamzad. "Real time classification and tracking of multiple vehicles in highways." Pattern Recognition Letters 26.10 (2005): 1597-1607.*

Caraffi, Claudio, et al. "A system for real-time detection and tracking of vehicles from a single car-mounted camera." Intelligent Transportation Systems (ITSC), 2012 15th International IEEE Conference on. IEEE, 2012.*

Ross, David A., et al. "Incremental learning for robust visual tracking." International Journal of Computer Vision 77.1-3 (2008): 125-141.*

Grabner et al., "Real-Time Tracking via On-line Boosting," http://www.vision.ee.ethz.ch/~hegrabne/papers/Grabner2006Real-TimeTrackingvia.pdf, 2006, 10 pgs.

Collins et al., "On-Line Selection of Discriminative Tracking Features," from Proceedings of the 9th IEEE Conference on Computer Vision (ICCV'03), 2003 IEEE Computer Society, 7 pages.

* cited by examiner

VIDEO OBJECT TRACKING IN TRAFFIC MONITORING

This application claims the benefit, under 35 U.S.C. § 119(b) of International Application PCT/CN2013/091110, filed Dec. 31, 2013.

TECHNICAL FIELD

The present principles relate generally to traffic monitoring and, more particularly, to video object tracking in traffic monitoring.

BACKGROUND

Object tracking has been widely used in real-world applications such as traffic monitoring, security surveillance, and so forth. In object tracking, an object of interest is usually bounded with a rectangle window, and the parameters of the window (which include window location, size and shape) are estimated for each picture in a video sequence. Generally for a real-world application, object tracking should achieve a fine balance between accuracy, robustness and limited bandwidth (e.g., across a camera network). However, conventional methods directed to object tracking typically cannot handle the problem of a time-varying foreground/background.

The wide range of objects to be tracked poses a challenge to any object tracking application. Different object and feature representations, such as color histograms, appearance models, and key-points, have been used for object tracking. In one conventional approach, feature selection involves the use a set of different feature spaces and "switching" to the most discriminative features.

Object tracking can be considered as a classification problem. The tracker continuously updates the current classifier that represents the object to optimally discriminate the object from the current background.

The tracker builds an initial classifier using the object region as positive samples and patches in the local neighborhood of the object region as negative samples. The initial object region is determined by a user or object detection. During the updating, the classifier is evaluated in a region of interest around the previous position. Conventional classifier based methods update the strong classifiers by adding and deleting weak classifiers over time to cope with scene changes.

Thus, conventional tracking methods have at least two significant problems, namely a time-varying scale and track deviation.

Regarding the time-varying scale, in a video sequence, the size of the object of interest usually changes according to its position, pose and distance to the camera. To determine the correct size of the bounding window, conventional tracking methods test window sizes from small to large, and find an optimal window size according to some criteria. This process is very time-consuming and sensitive to perturbation from the environment. For those tracking methods that employ a classification technique, the correct window size is vital. An improper window size will significantly influence the classification performance as well as deteriorate the final tracking performance.

Regarding track deviation, in a tracking process, the bounding box or tracking window can significantly deviate from the object of interest due to perturbation or noise. Since these problems are not well addressed by conventional tracking methods, there is a need for improved methods.

SUMMARY OF THE INVENTION

These and other drawbacks and disadvantages of the prior art are addressed by the present principles, which are directed to video object tracking in traffic monitoring.

One aspect of the present principles provides a method for object tracking in a video sequence, the method includes: selecting a region of interest (ROI) in a current video frame for tracking an object, the ROI including at least a location and a size associated with the object; determining a first new location for the ROI based on on-line updates of a plurality of features for tracking the object; recording the determined first new location, if the determined first new location is within a range of permissible locations calculated from a predicted velocity of the object; and adjusting the size of the ROI based on an estimated change in a scale of the object, wherein the adjusted ROI is used for tracking the object in a subsequent video frame.

Another aspect of the present principles provides a method for tracking an object in a video sequence formed from a plurality pictures, the method includes: selecting a region of interest in a current one of the plurality of pictures, the region of interest including a location and a scale associated with the object; determining a new location of the object based on on-line updates of object features; recording the new location of the object in a memory device when the new location of the object is determined to be within a range of permissible locations calculated from an object velocity predicted for the object; and re-estimating the new location to obtain a re-estimated location of the object when the new location of the object is determined to be outside of the range of permissible locations; wherein the new location is used when the new location of the object is determined to be within a range of permissible locations or the re-estimated location of the object is used when the new location of the object is determined to be outside of the range of permissible locations, to track the object in a subsequent one of the plurality of pictures.

Yet another aspect of the present principles provides a system for object tracking in a video sequence, the system includes: a first processor configured for selecting a region of interest (ROI) in a current video frame for tracking an object, the ROI including at least a location and a size associated with the object; determining a first new location for the ROI based on on-line updates of a plurality of features for tracking the object; a memory for recording the determined first new location, if the determined first new location is within a range of permissible locations calculated from a predicted velocity of the object; and the first processor further configured for adjusting the size of the ROI based on an estimated change in a scale of the object, wherein the adjusted ROI is used for tracking the object in a subsequent video frame.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to video object tracking in traffic monitoring, and can be used to track an object in one or more picture from a sequence of pictures that form a video sequence. As used herein, the words "picture" and "image" are used interchangeably and refer to a still image or a picture from a video sequence. As is known, a picture can be a frame or a field.

The present principles provide a video object tracker for estimating a bounding box or tracking window for an object of interest. This tracking window, which is also referred to as a "region of interest" (ROI), is characterized by at least two parameters: a location and a scale (or size) associated with or related to the object being tracked. In one embodiment, the video object tracker includes a boosting tracker and a motion model. The video object tracker adaptively works in real-time, and can adapt to the surrounding environment, light sources, and size changes of the object of interest in the picture.

In one embodiment, weak classifiers in the boosting tracker are trained to distinguish between an object of interest and the background in a picture and adapt over time to input samples. In another embodiment, a strong classifier is formed by combining a set of weak classifiers, and is used to track an object of interest in a video sequence. The motion model is used to ensure the validity of a new position of the tracked object in the video sequence, and then record the results. This information can be used to improve the performance of object tracking.

Figure 1:
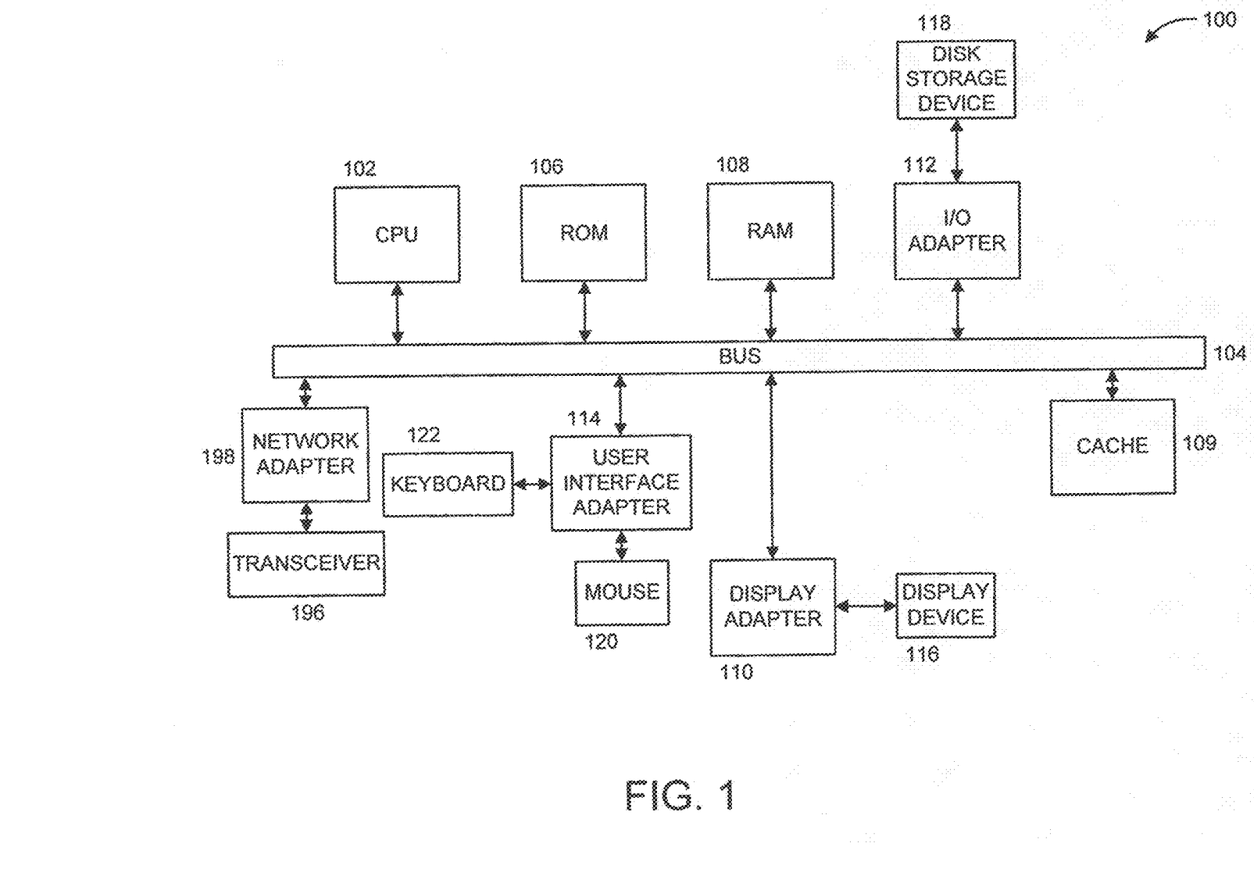
FIG. 1 shows an exemplary processing system to which the present principles can be applied, in accordance with an embodiment of the present principles.

FIG. 1 shows an exemplary processing system 100 to which the present principles may be applied, in accordance with an embodiment of the present principles. The processing system 100 includes at least one processor (CPU) 102 operatively coupled to other components via a system bus 104. A read only memory (ROM) 106, a random access memory (RAM) 108, a display adapter 110, an input/output (I/O) adapter 112, a user interface adapter 114, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112.

A mouse 120 and keyboard 122 are operatively coupled to system bus 104 by user interface adapter 114. The mouse 120 and keyboard 122 are used to input and output information to and from system 100.

A transceiver 196 is operatively coupled to system bus 104 by network adapter 198.

The processing system 100 may also include other elements (not shown), omit certain elements, as well as other variations that are contemplated by one of ordinary skill in the art given the teachings of the present principles provided herein.

Figure 2:
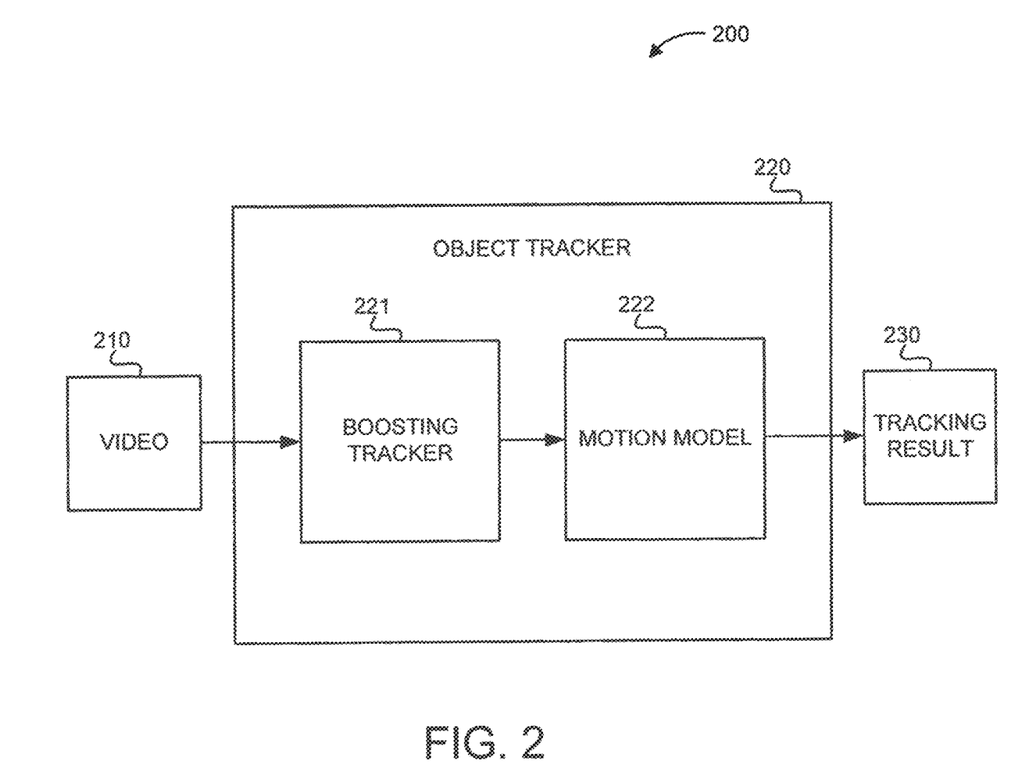
FIG. 2 shows an exemplary system for tracking an object in a video sequence, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200, and part or all of processing system 100 and system 200 may perform at least some of the method steps described herein including, for example, method 400 of FIG. 4.

FIG. 2 shows an exemplary system 200 for tracking an object in a video sequence, in accordance with an embodiment of the present principles. The system 200 includes a video source 210, an object tracker 220, and tracking result 230. The video source 210 can be considered an input to the object tracker 220, and the tracking result 230 can be considered an output of the object tracker 220.

The object tracker 220 includes a boosting tracker 221 and a motion model 222. The boosting tracker 221 uses a learning algorithm for object tracking. After initiation, the boost tracker uses a strong classifier to detect an object of interest in a search region of a current video frame from a video source 210. Weak classifiers are updated to form an updated strong classifier for a next video frame. These classifiers are used to select the features to separate the object from the background.

Since the tracking result (e.g., region of interest, ROI) from the boosting tracker may not be correct or reliable, a motion model is used to check for its validity, and if necessary, to refine the result. If the result of the boosting tracker 221 is determined to be correct, the result will be stored in memory. Otherwise, it will be refined by the motion model 222 to produce an updated result, which is then stored in memory. The correct tracking results from the object tracker 220 (i.e., either from the boosting tracker or updated result from the motion model) form a history of tracking results.

The history of tracking results for the object in each frame is stored in a memory. Since, as noted above, one or more elements of processing system 100 can be included in one or more elements of system 200, the memory can be located in and/or configured to be used by any of the boosting tracker 221 and the motion model 222. In one embodiment, the history of tracking results can be used to build the motion model 222.

Figure 3:
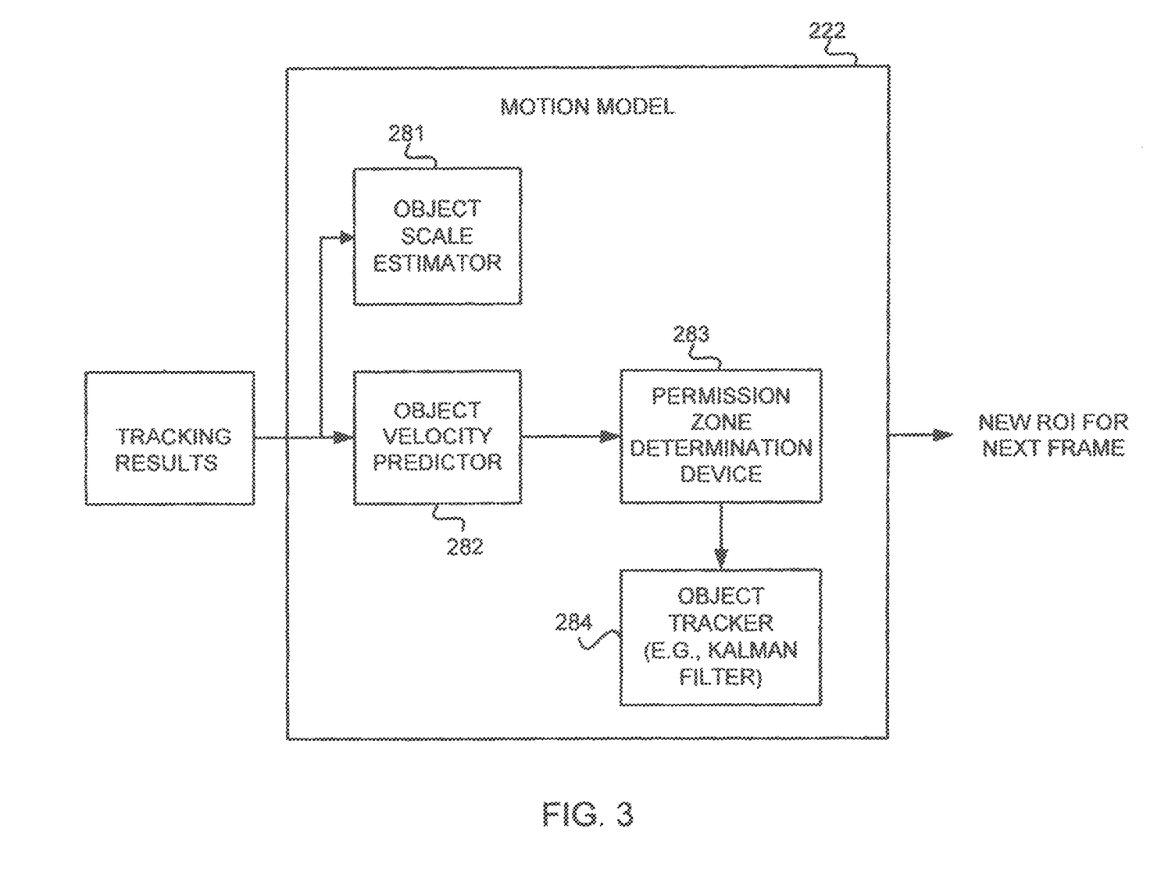
FIG. 3 shows the motion model of FIG. 2, in accordance with an embodiment of the present principles.

FIG. 3 shows details of the motion model 222 of FIG. 2, in accordance with an embodiment of the present principles. The motion model 222 includes an object scale estimator 281 for checking and estimating the scale of an object to adapt to the changing size of the object in a sequence of pictures. The motion model 22 also includes an object velocity predictor 282, a permission zone determination device 283 and an object tracker 284 for checking the position or location of the object, and updating the location, if necessary. Specifically, the object velocity predictor 282 predicts the velocity of the object, the permission zone determination device 283 builds a permission zone for checking whether the result from the boosting tracker 221 is correct or not. If the tracking result from boosting tracker is outside the permission zone, the object tracker 284 predicts a new position (which is included as a part of the region of interest) of the object in the next frame.

As shown in FIG. 3, the tracking results from the boosting tracker 221 are provided as input to the motion model 222, and in particular, to the object scale estimator 281 and the object velocity predictor 282.

The object scale estimator 281 generates a scale estimation of an object of interest in a picture. The tracking window or region of interest is adapted over time according to the scale estimation to account for size changes in the object. The scale estimation can be determined, with or without camera parameters. For example, in one embodiment, the scale estimation is determined based on the history of tracking results.

Based on an object velocity prediction provided by the object velocity predictor 282, a possible region or permission zone is constructed by the permission zone determination device 283. In one embodiment, the permission zone is used to check the tracking result in each frame. The permission zone is used to prevent a large deviation of the tracking result by the boosting tracker 221, which would presumably indicate an error in the tracking of a given object. Thus, in one embodiment, the range of permissible locations (that is, the permission zone) is checked on a per-picture basis to prevent tracking error carryover in subsequent pictures or images.

The object tracker 284, which is used to refine the results for object tracking in the case that the boosting tracker 221 fails, can be based on a Kalman filter or some other object tracking approach and/or filter.

The output from the motion model 222 will includes result from boosting tracker that is within the permission zone (without refinement by object tracker 284) and/or refined result from the object tracker 284. As shown in FIG. 3, the result from the motion model will be used as a new ROI (including location and scale associated with or related to the object) for use in the next video frame. The output from the motion model will be stored in memory, and will form a part of the history of tracking results.

Figure 4:
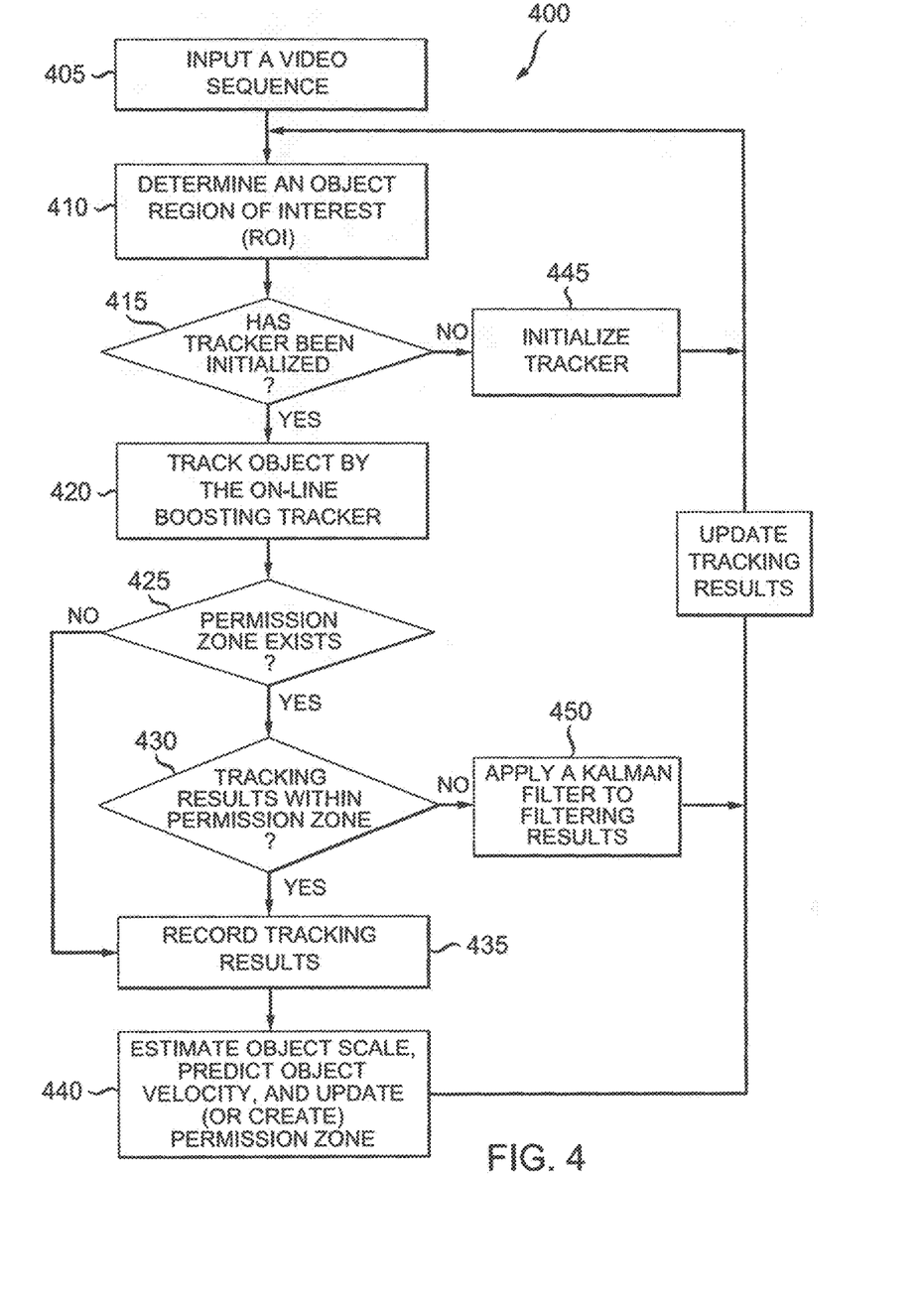
FIG. 4 shows an exemplary method for tracking an object in a video sequence, in accordance with an embodiment of the present principles.

FIG. 4 shows an exemplary method 400 for tracking an object in a video sequence, in accordance with an embodiment of the present principles. At step 405, a video sequence is input or provided to the method 400.

At step 410, an object's region of interest (ROI) or tracking window is determined. At the beginning of the process, an "initial" ROI is determined by a user and/or using object detection, which will be used to initialize the object tracker 221 in the initial frame. After initialization (i.e., subsequent frames), the ROI is determined by the tracking result in the last (i.e., previous) frame. As previously mentioned, the ROI is characterized by at least two parameters, a location and a scale (size) associated with an object to be tracked.

At step 415, it is determined whether the boosting tracker 221 has been initialized. If so, the method proceeds to step 420. If the boosting tracker 221 has not been initialized, it is initialized at step 445. In one example, the number of weak classifiers is set to 100, and the size of a searching region is set to be twice as large as the ROI.

At this initial stage, the size of the ROI will be larger than the size of the object. Essentially, the initialization allows the object of interest to be identified or determined, so that the boost tracker can learn about features of the object for tracking purpose (e.g., based on the initial ROI, positive and negative samples are collected for training the weak classifiers). The method then returns to step 410 where another ROI is determined for use in tracking the object in the next frame. At initialization, the ROI comes from user's input or object detection, while during tracking, the ROI comes from results in the last frame based on boosting tracker.

At step 420, the object is tracked by the on-line boosting tracker 221, which uses a strong classifier to detect the object in the search region, and finds the best position for the object in the current frame. The ROI and the search region are then updated. Based on the new searching region, negative and positive samples are collected for updating the classifiers for the next frame. Details of the boosting tracker will be further discussed in conjunction with FIG. 5.

At step 425, a determination is made as to whether a permission zone exists. If it is determined that a permission zone does not exist, the method goes to step 435, where the tracking results from the online boosting tracker are recorded. According to embodiments of the present invention, for a given or predetermined number of initial frames (e.g., 10 frames), the system assumes that the tracking results from the boosting tracker are correct. Therefore, results corresponding to these number of frames are not checked by the motion model for correctness (i.e., no checking against any permission zone). Instead, the results from the boosting tracker for these frames are used for creating the permission zone (see step 440).

However, at step 425, if a permission zone is found to already exist (e.g., created based on previous tracking results), then the method proceeds to step 430, where it is examined as to whether the tracking results from step 420 are within the permission zone. If the tracking results from the boosting tracker are within the permission zone, they are recorded at step 435.

After recording the tracking results in step 435, the method goes to step 440, where an object scale is estimated, an object velocity is predicted, and a permission zone is updated or created. As previously mentioned, if a permission zone does not exist at this stage, it is created at step 440.

Returning to step 430, if the results from the boosting tracker are determined to be outside the permission zone, a Kalman filter is applied at step 450 to refine the results, so that the filtered tracking results lie within the permission zone. Aside from Kalman filtering, other object tracking approaches can also be used at step 450. The refined results are also used to update the tracking results and stored in memory.

The various method steps of FIG. 4 can be implemented using the system of FIG. 2, as summarized below. Prior to initialization of the object tracker, an object's ROI is determined by a user and/or using object detection, and used to initialize the boosting tracker 221 in the initial frame. After the tracking starts, the ROI is determined from the tracking result in the last frame. The tracking result is output by the on-line boosting tracker 221 and checked by the motion model 222. If the tracking result is within the permission zone, the tracking result is recorded in memory. The tracking result is used by the object velocity predictor 282 to predict object velocity, and update the permission zone by the permission zone determination device 283. The object scale is estimated by the object scale estimator 281 to adapt to the changing size of the object in the current frame, and a new or updated ROI is output for the next frame. If the tracking result is not within the permission zone, the Kalman filter is used to determine a new position for the object, which is also used for updating the tracking results.

One aspect of the present invention also provides a non-transient computer readable medium, with stored instructions that, when executed by one or more processors, will implement one or more steps of method 400 as described above.

Additional details will now be given, in conjunction with the example in FIG. 5, regarding the on-line boosting tracking, in accordance with an embodiment of the present principles.

In traffic surveillance, the picture quality is often relatively poor, with limited resolution, interlacing effects, motion blur, as well as compression artifacts being a common phenomenon. This makes it difficult to find informative features in the scene. On-line feature selection as described herein can tackle a large variety of real-time tasks and manage very large feature pools at reduced computational costs. The boosting tracker algorithm used for implementing the present principles is based in part on Grabner's "Real-time Tracking via Online Boosting", Proceeding of the British Machine Vision Conference, 2006, which is herein incorporated by reference in its entirety.

With on-line updating of the features of the object during tracking, the method of the present principles is able to cope with appearance changes of the object.

Figure 5:
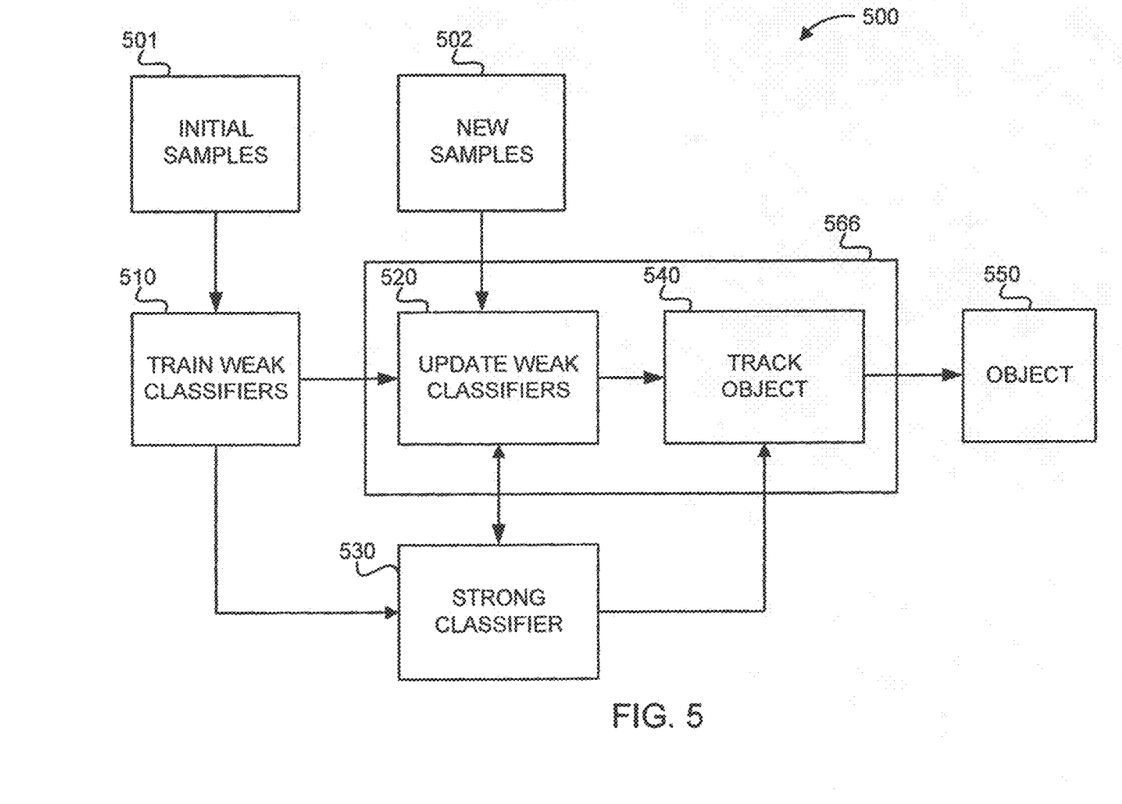
FIG. 5 shows an exemplary method for performing on-line boosting tracking, in accordance with an embodiment of the present principles.

FIG. 5 shows an exemplary method 500 for performing on-line boosting tracking, in accordance with an embodiment of the present principles. For example, method 500 can be performed by the boosting tracker of FIG. 2. Initial samples 501 and new samples 502 (e.g., a sequence of images or video frames, the samples include negative ones and positive ones. The positive ones are pixels in the ROI; and the negative ones are pixels in the searching region that is outside the ROI. See FIG. 6.) are provided as inputs to method 500. Weak classifiers are trained (step 510) based on the initial samples 501. Every weak classifier corresponds to one or more features associated with an object to be tracked in the video sequence. Some examples of suitable features include color, shape and texture of the object, among others. In one example, a Haar-like feature is used to represent the texture of an object. For each ROI in the current frame, different types of features are used for generating weak hypotheses. The feature selection depends on the application. For example, one embodiment uses Haar-like features, which can be computed very efficiently using integral pictures, while another embodiment uses color, which is a widely used feature in traffic applications. The present principles are not limited to the preceding features and other features can also be used while maintaining the spirit of the present principles.

Thus, a set of weak classifiers are trained (in step 510) based on initial samples 501 and updated (in step 520) based on the new samples 502. In one embodiment, the initial samples 501 are object samples (pixels) in the initial frame. The number of weak classifiers can vary depending on the application. A strong classifier 530 is used to track (in step 540) an object 550 in a sequence of pictures that form a video sequence. In method 500, boosting tracking 566 can be considered to at least include updating the weak classifiers 520 and tracking step 540. Thus, the present principles advantageously adapt to a changing scene.

In one embodiment, the surrounding background is used as negative samples to update the weak classifiers in step 520. In addition, the negative samples enable choosing the most discriminative features between the object and the background.

In another embodiment, tracking is based on template tracking, in which templates are formed using simple geometric shapes or silhouettes, and an object's appearance is generated from a single view. The boosting tracker evaluates the strong classifier at a region of interest (ROI) and obtains for each position a confidence value. Then, the tracker analyzes a confidence map and shifts the tracking window to the new location of the maxima. The new position for the object is obtained in the current frame. The pixels in the tracking window in a new sample are used to update the classifiers to adjust to possible changes of the object.

A description will now be given, in conjunction with the example in FIG. 6, regarding scale detection, in accordance with an embodiment of the present principles.

Even if the boosting tracking is sufficient to locate the object in a changing scene, which may not always be the case, the error of the tracking results increases if the classifier is updated incorrectly. Since the scale of the object in the picture changes gradually, the motion information of the object is used to compensate for the tracking results from the boosting tracking method.

Figure 6:
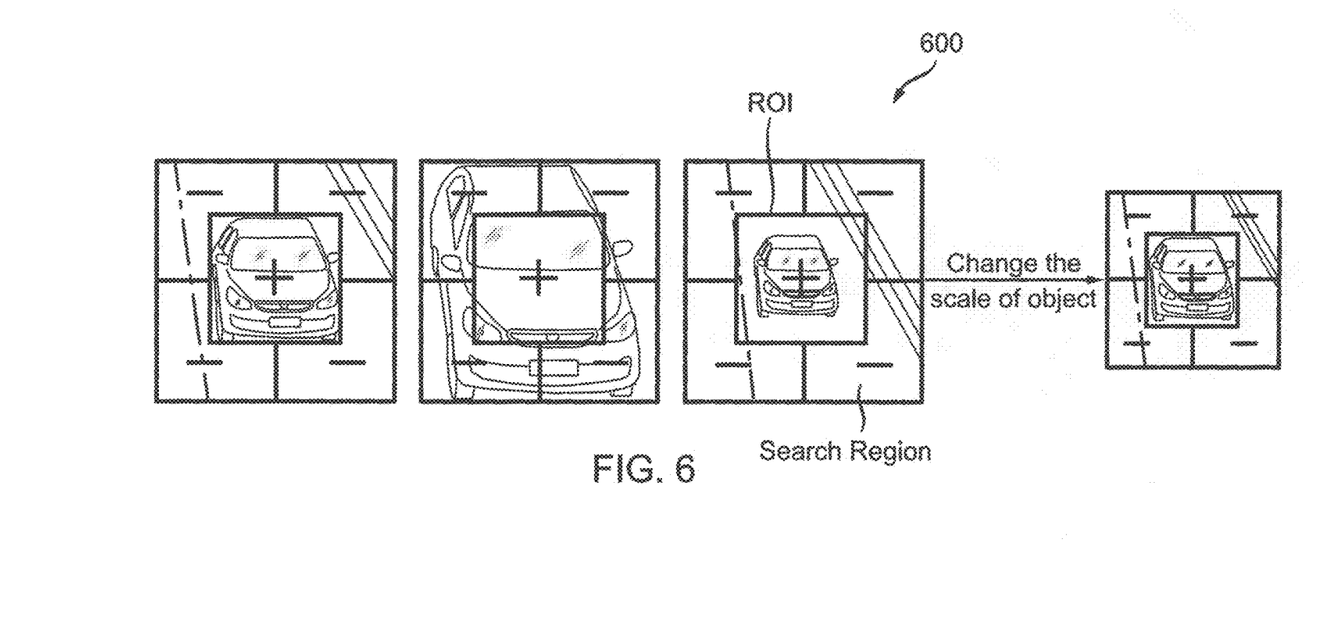
FIG. 6 shows a changing scale of an object across various pictures in a picture sequence to which the present principles can be applied, in accordance with an embodiment of the present principles.

FIG. 6 is a sequence of images 600 illustrating a changing scale of an object across various pictures in the sequence to which the present principles can be applied. As is evident, the scale of the object, in this case a car, has greatly changed across the four depicted pictures with the movement of the object. For an example relating to car tracking in traffic surveillance, the training uses pixels extracted from "the tracked car" as positive samples (+), and pixels extracted from the "background" around the neighborhood as negative samples (−). The smaller rectangular-shaped bounding box is the tracking window or ROI, which is used to create a confidence map to locate the object in the current frame. Surrounding the ROI is a search region (outer rectangular boundary), which, in this example, is about 2 times as large as the ROI, and has the same center as the ROI.

The size of the tracking window needs to adapt to the change of the object scale. For example, when the object (car) becomes smaller in the picture and the size of the window remains constant, the positive samples would include an increased number of background pixels which were previously (i.e., in previous images or frames) negative samples. Such errors in the samples would affect the updating of the classifiers and even cause tracking failure in the next frames.

In order to estimate the scale of an object in the picture, the camera needs to be calibrated. In practical applications, however, it is difficult to get the parameters of the camera and the position of the object in the real-world coordinate system.

An underlying idea for the object scale estimation is to adapt to any scale change gradually and dynamically in an on-line manner. As used herein, "gradually" means no more than a threshold amount over a given time interval. In an embodiment, the time interval corresponds to one picture. Of course, other time intervals can also be used, depending upon the application. The new tracking position in the current frame is acquired from the classifier and processed for predicting the scale change in the next frame. This is in contrast with conventional approaches which iteratively resize the tracking window and find the best scale and position for the object in the current frame.

The tracking window is updated to adapt to changes in the scale of the object across multiple pictures. Without considering picture distortion, the object size is re-estimated at fixed time intervals based on the initial input ROI ($x_{input}$, $y_{input}$, width_input, height_input), where $x_{input}$ and $y_{input}$ are the x- and y-coordinates of the center of the initial ROI, and width_input and height_input are the width and height of the initial ROI.

$$width_j(x, y) = r_j(x, y) * \text{width\_input}$$

$$height_j(x, y) = r_j(x, y) * \text{height\_input}$$

$$r_j(x, y) = \begin{cases} 1 + \dfrac{1 - e^{-\lambda_2 D_j(x,y)}}{1 + e^{-\lambda_1 D_j(x,y)}}, & \text{when object is towards the camera} \\ \dfrac{e^{-\lambda_1 D_j(x,y)} + e^{-\lambda_2 D_j(x,y)}}{1 + e^{-\lambda_1 D_j(x,y)}}, & \text{when object is away from the camera} \end{cases},$$

and $$D_j(x, y) = \sqrt{(x - x_{input})^2 + (y - y_{input})^2}.$$

In the above equations, j represents the $j^{th}$ frame in an input video sequence; $r_j(x,y)$ represents the ratio between the input and output; $width_j(x,y)$ or $height_j(x,y)$ represents the updated width or height of an object in the $j^{th}$ frame based on the input; and $D_j(x,y)$ represents the distance between the position of the object in the $j^{th}$ frame and the initial position in the first frame.

The vector (x, y) is the center of the ROI in the picture. The coefficients ($\lambda_1$, $\lambda_2$) are determined by experience. In one embodiment, $\lambda_1=\lambda_2=0.01$ when the object is facing towards the camera, and $\lambda_1=\lambda_2=0.02$ when the object is facing away from the camera. The e is Euler's number, also known as Euler's constant.

A description will now be given, in conjunction with the example in FIG. 7, regarding the permission zone for tracking results, in accordance with an embodiment of the present principles.

In a traffic surveillance application, the on-line boosting tracker method can fail due to relatively poor picture quality. According to the present principles, the motion model is used to respond to this failure. That is, when the boosting tracker 221 fails, object tracking based on a Kalman filter or other tracker 284 in the motion model 222 can be used.

First, the tracking results from the on-line boosting tracker 221 need to be checked. The object velocity is predicted and a permission zone is built for the tracking results. The tracking results in the time window are recorded. Moreover, it is assumed that the velocity vector of the object is constant within the certain time window. In one embodiment, a simple data set consists of n points (data pairs) ($x_k$, $y_k$), where the vector ($x_k$, $y_k$) is the object position in the k-th frame. A straight line model can be determined as follows:

$$y_k = a*x_k + b$$

The least squares method is used to find the parameter values for the motion model 222 that best fits the data as follows:

$$a = \dfrac{\sum\limits_{i=1}^{n} x_i y_i - n\bar{x}\bar{y}}{\sum\limits_{i=1}^{n} x_i^2 - n(\bar{x})^2}$$

$$b = \bar{y} - a\bar{x}$$

where $\bar{x} = \dfrac{1}{n}\sum\limits_{i=1}^{n} x_i$ and $\bar{y} = \dfrac{1}{n}\sum\limits_{i=1}^{n} y_i$.

These parameters are used to construct a permission zone for the tracking position in the next frame. From these parameters, a predicted direction of the velocity of the object in the current frame can be obtained. This predicted direction and new location of the object should fall within the permission zone.

Figure 7:
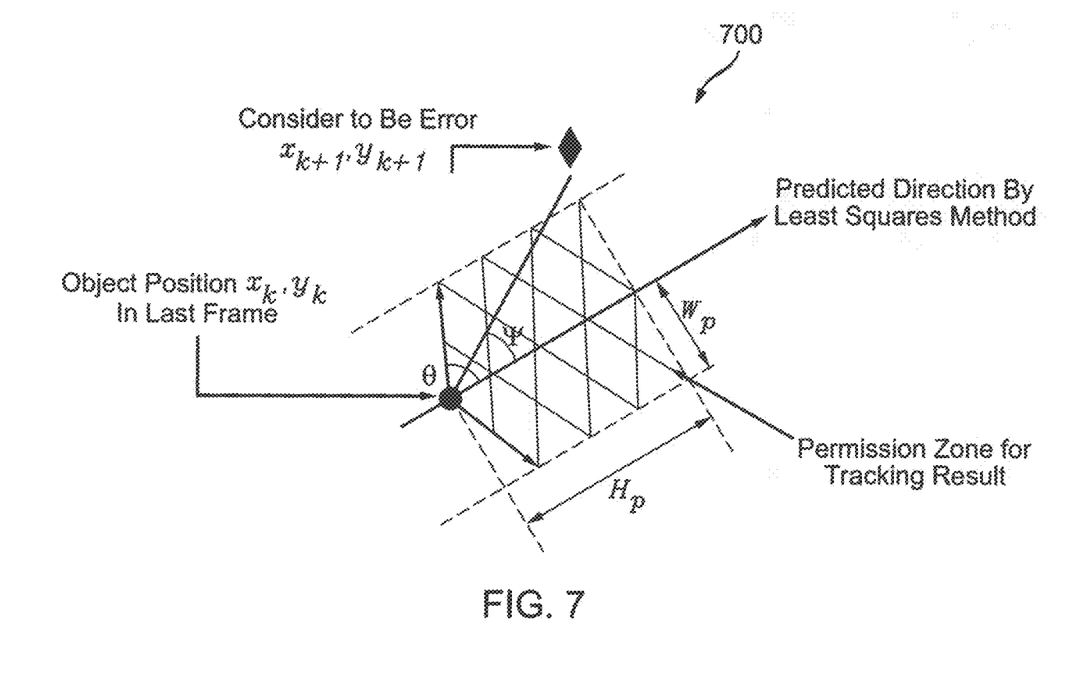
FIG. 7 shows the permission zone for tracking results, in accordance with an embodiment of the present principles.

FIG. 7 shows the permission zone 700 (indicated by the hash pattern) for tracking results, in accordance with one embodiment of the present principles. It is assumed that the object velocity is constant between adjacent frames. Under this assumption, the position $P_{k+1}$ ($x_{k+1}$, $y_{k+1}$) marked as a diamond symbol in FIG. 7, which is out of the permission zone, is considered to be an error. This tracking result is rejected by the motion model 222, and then the tracking position is determined based on the Kalman filter 284.

The permission zone is given by the following:

$$\begin{cases} \arccos(P_k \cdot P_{k+1}) \leq \theta \\ |P_k - P_{k+1}|\cos\psi \leq W_p \\ |P_k - P_{k+1}|\sin\psi \leq H_p \end{cases}$$

where $\theta$, $W_p$, and $H_p$ are determined by the user before the start of object tracking using the boosting tracker 221. In one embodiment, $\theta=60$ degrees, $W_p=20$ pixels, and $H_p=30$ pixels. The object velocity vector should be re-estimated within a certain time interval. Then the permission zone should be updated.

The system needs to determine whether or not the tracking results are within the permission zone. If the tracking results meet the requirements (i.e., are within the permission zone), the system moves onto the next frame. Otherwise, the motion model 222 is used to predict a new position of the object based on the history results and the information of the permission zone. Again, the Kalman filter or another technique can be used to predict the new position of the object.

Figure 8A:
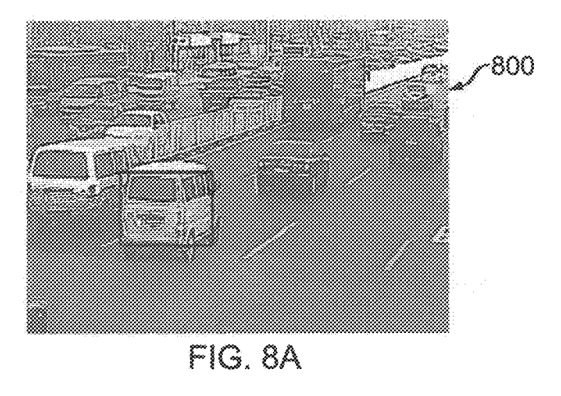
FIG. 8A-D shows several images illustrating an example of car tracking, in accordance with an embodiment of the present principles.
Figure 8B:
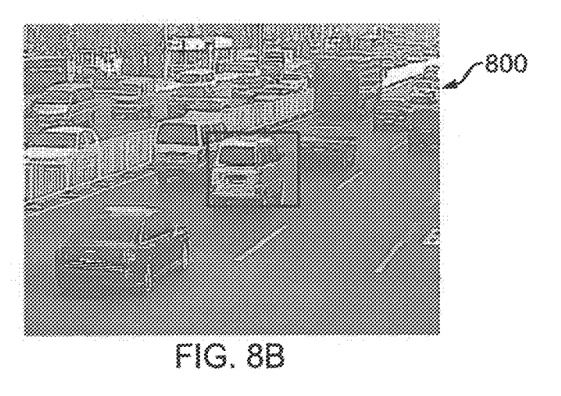
Figure 8C:
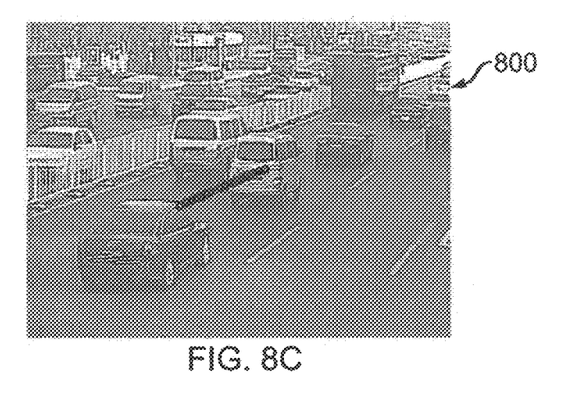
Figure 8D:
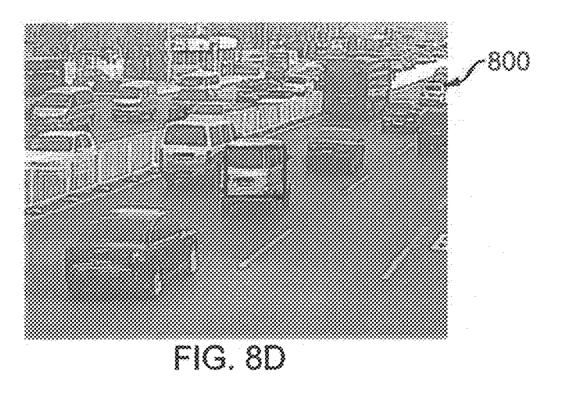

FIG. 8A-D shows several images 800 for illustrating an example of car tracking, in accordance with an embodiment of the present principles. The rectangular-shaped bounding box in each of FIGS. 8A, 8B, 8C and 8D is the tracking window for the car. As shown in these images, the bounding box will scale down to adapt to the changed size of the car in the picture. The circles in FIG. 8C are the tracking positions of the car in 20 consecutive frames.

While the present principles are primarily described with respect to traffic skill in the art will contemplate this and various other applications to which the present monitoring, given the teachings of the present principles provided herein, one of ordinary principles can be applied, while maintaining the spirit of the present principles. Other exemplary applications include, but are not limited to, video indexing, video editing, color correction, and so forth. It is to be appreciated that the preceding list is merely illustrative and not exhaustive.

The functions of the various elements shown in the figures may be provided through the use of dedicated hardware as well as hardware capable of executing software in association with appropriate software. When provided by a processor, the functions may be provided by one or more processors, any one or some of which may be dedicated or shared.

Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

It is to be understood that the teachings of the present principles may be implemented in various forms of hardware, software, firmware, special purpose processors, or combinations thereof. Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A method for object tracking in a video sequence comprising a plurality of video frames, the method comprising:
    selecting a region of interest (ROI) in a current one of the video frames for tracking an object, the ROI including at least a location and a size associated with the object;
    adjusting dynamically said ROI based on an estimated change determined as a result of tracking changes occurring to account for size changes of said object over a given time interval;
    providing a booster tracker to learn about features of said object for tracking purposes;
    determining a first new location for the ROI based on on-line updates of a plurality of features for tracking the object;
    preventing tracking error carryover in subsequent ones of the plurality of video frames by establishing a permissible zone in each of the plurality of video frames calculated from a predicted velocity of the object such that a range of permissible locations for the object are constrained by the permissible zone;
    predicting a second new location for the object by applying a filter to the ROI from the current video frame, if the determined first new location is outside the permissible zone;
    recording the determined first new location, if the determined first new location is within said permissible zone; and
    adjusting the size of the ROI based on an estimated change in a scale of the object, wherein the adjusted ROI is used for tracking the object in a given one of the subsequent video frames.

2. The method of claim 1, wherein said filter is a Kalman filter.

3. The method of claim 1, wherein the size of the ROI is dynamically adapted over a given time interval according to the estimated change in the scale of the object by looking at previous frames during subsequent frames and through user input or object detection during initial frames.

4. The method of claim 1, wherein the estimated change in the scale of the object is determined from a history of tracking results previously obtained for the object.

5. The method of claim 1, wherein the estimated change in the scale of the object is determined without any knowledge of camera parameters corresponding to the sequence.

6. The method of claim 1, wherein the range of permissible locations is checked on a per-frame basis to prevent tracking error carryover in the subsequent ones of the video frames.

7. A method for tracking an object in a video sequence formed from a plurality of video frames, the method comprising:
    selecting a region of interest (ROI) in a current video frame for tracking the object, the ROI including at least a location and a size associated with the object;
    adjusting said ROI based on an estimated change determined as a result of tracking changes occurring to account for size changes of said object over a given time interval;
    providing a booster tracker to learn about features of said object for tracking purposes;
    determining a new location of the object based on on-line updates of object features;
    preventing tracking error carryover in subsequent video frames by establishing a permissible zone in each of the plurality of video frames calculated from a predicted velocity of the object such that a range of permissible locations for the object are constrained by the permissible zone;
    predicting a second new location for the object by applying a filter to the ROI from the current video frame, if the determined first new location is outside the permissible zone;
    recording the determined first new location, if the determined first new location is within the range of permissible locations of said permissible zone calculated from the predicted velocity of the object; and
    re-estimating the new location to obtain a re-estimated location of the object when the new location of the object is determined to be outside of the permissible zone,
    wherein the new location is used when the new location of the object is determined to be within the range of permissible locations or the re-estimated location of the object is used when the new location of the object is determined to be outside of the range of permissible locations, to track the object in a subsequent one of the plurality of video frames.

8. The method of claim 7, wherein a history of tracking results for the object is used to re-estimate the new location of the object.

9. The method of claim 7, wherein the estimated change in a scale of the object is determined from a history of tracking results previously obtained for the object.

10. A system for object tracking in a video sequence comprising a plurality of video frames, comprising:
a first processor configured for
selecting a region of interest (ROI) in a current one of the plurality of video frames for tracking an object, the ROI including at least a location and a size associated with the object,
determining a first new location for the ROI based on on-line updates of a plurality of features for tracking the object, and
preventing tracking error carryover in subsequent video frames by establishing a permissible zone in each of the plurality of video frames calculated from a predicted velocity of the object such that a range of permissible locations for the object are constrained by the permissible zone;
predicting a second new location for the object by applying a filter to the ROI from the current video frame, if the determined first new location is outside the permissible zone;
a memory for recording the determined first new location, if the determined first new location is within any permissible zone in each video sequence calculated from the predicted velocity of the object;
the first processor further configured for adjusting the size of the ROI based on an estimated change in a scale of the object, wherein the adjusted ROI is used for tracking the object in a subsequent one of the plurality of video frames; and
a booster tracker for adjusting said ROI based on an estimated change determined as a result of tracking changes occurring to account for size changes of said object over a given time interval and for learning about features of said object for tracking purposes.

11. The system of claim 10, further comprising a second processor for predicting a second new location for the video object, if the determined first new location is outside the range of permissible locations.

12. The system of claim 10, wherein the first processor is configured for dynamically adapting the size of the ROI over a given time interval according to the estimated change in the scale of the object.

* * * * *